US012696094B2

(12) United States Patent
DeVito et al.

(10) Patent No.: US 12,696,094 B2
(45) Date of Patent: Jul. 28, 2026

(54) DETECTING WIRELESS DEVICES IN OR ON A VEHICLE

(71) Applicant: FCA US LLC, Auburn Hills, MI (US)

(72) Inventors: Erik DeVito, Royal Oak, MI (US); Dhruy Acharya, Shelby Township, MI (US)

(73) Assignee: FCA US LLC, Auburn Hills, MI (US)

( * ) Notice: Subject to any disclaimer, the term of this patent is extended or adjusted under 35 U.S.C. 154(b) by 334 days.

(21) Appl. No.: 18/482,220

(22) Filed: Oct. 6, 2023

(65) Prior Publication Data

US 2025/0119745 A1      Apr. 10, 2025

(51) Int. Cl.
*H04W 12/121* (2021.01)
*H04W 8/00* (2009.01)

(52) U.S. Cl.
CPC ......... *H04W 12/121* (2021.01); *H04W 8/005* (2013.01)

(58) Field of Classification Search
None
See application file for complete search history.

(56) References Cited

U.S. PATENT DOCUMENTS

2019/0061692 A1* 2/2019 Bobay ..................... B60R 25/33
2019/0077368 A1* 3/2019 Hwang ................... B60R 25/24

OTHER PUBLICATIONS

Apple Statement; An Updated on AirTag and Unwanted Tracking; https://www.apple.com/newsroom/2022/02/an-update-on-airtag-and-unwanted-tracking/; dated Feb. 10, 2022.
Kickstarter—BlueSleuth-Lite-Detect Hidden AirTags; https://www.kickstarter.com/projects/1458746827/bluesleuth-lite-detect-hidden-airtags, dated 2023; (1 page).

* cited by examiner

*Primary Examiner* — Frantz Bataille
(74) *Attorney, Agent, or Firm* — Jeremy J. Klobucar

(57) ABSTRACT

In at least some implementations, a method of detecting a wireless device in or on a vehicle, includes detecting a wireless signal that includes identification information, comparing the identification information with a registry of authorized devices to determine if the identification information corresponds to one of the authorized devices, and providing an output when the identification information does not correspond to one of the authorized devices to indicate that an unauthorized device is present in or on the vehicle.

20 Claims, 2 Drawing Sheets

DETECTING WIRELESS DEVICES IN OR ON A VEHICLE

FIELD

The present disclosure relates to detecting wireless devices in or on a vehicle.

BACKGROUND

Wireless devices may be provided in or on a vehicle for different purposes. Some wireless devices permit the location of the device to be tracked or determined from a remote location. Such trackable devices may be provided on a vehicle without knowledge of a user, owner or occupant of the vehicle. These devices can be small and difficult to detect, and in some instances can put the user and/or vehicle at risk.

SUMMARY

In at least some implementations, a method of detecting a wireless device in a vehicle, includes detecting a wireless signal that includes identification information, comparing the identification information with a registry of authorized devices to determine if the identification information corresponds to one of the authorized devices, and providing an output when the identification information does not correspond to one of the authorized devices to indicate that an unauthorized device is present in the vehicle.

In at least some implementations, the identification information includes a code that is unique to each device that transmits the wireless signal. This facilitates determination of previously authorized devices from devices not previously authorized, and may facilitate repeat identification of devices indicating that the device is within or on the vehicle and not merely close to the vehicle but not carried by the vehicle.

In at least some implementations, the step of providing a prompt to add the identification information to the registry so that the device transmitting the wireless signal is added to the registry as an authorized device.

In at least some implementations, the communication device is responsive to one or more of Bluetooth, Ultra Wideband and wifi signals. In at least some implementations, the prompt is provided via a vehicle infotainment system including a display and inputs by which menu options provided on the display can be selected.

In at least some implementations, the output includes a predicted location of the unauthorized device. In at least some implementations, the predicted location is determined based upon a comparison of wireless signals received at different communication devices of the vehicle.

In at least some implementations, the communication device is part of a vehicle operating system and permits control of at least one vehicle system via a remote device that communicates wirelessly with the communication device. In at least some implementations, the communication device is arranged to pair with a smart phone to permit operation of the vehicle when the smart phone is paired.

In at least some implementations, the method also includes determining the presence of an occupant of the vehicle and then detecting all wireless signals present at one or more communication devices of the vehicle, and comparing the identity of all devices providing a wireless signal with the registry.

In at least some implementations, the method also includes storing identification information of unauthorized devices and wherein the method is run more than one time and includes sending an alert if one of the unauthorized devices is detected in more than one iteration of the comparing step.

In at least some implementations, a vehicle having a system for detecting wireless devices on or within the vehicle, includes a communication device, a display and a control system. The communication device includes an antenna capable of receiving a wireless signal. The display is arranged within an interior of the vehicle. And the control system is coupled to the communication device and to the display, and the control system has a processor and memory including a registry of authorized devices. The control system is operable to compare the wireless signal to the registry and to provide an output to the display when the wireless signal is determined to be from a device that is not one of the authorized devices.

In at least some implementations, the communication device is located within the interior of the vehicle. In at least some implementations, the communication device is arranged to permit pairing of a remote device with the control system to permit control of at least one vehicle function via the remote device. In at least some implementations, the at least one vehicle function includes one or more of locking or unlocking a vehicle door, and starting an engine or motor of the vehicle.

In at least some implementations, the memory includes instructions that provide an interface via the display that permits a user to add a device to the registry of authorized devices.

In at least some implementations, the communication device and the display are part of a vehicle infotainment system that is coupled to the control system and which permits control of one or more of an audio device, a video device, a vehicle heating and cooling system, and vehicle preference settings.

In at least some implementations, the communication device is a first communication device that is responsive to Bluetooth signals, and wherein the vehicle also comprises a second communication device that is responsive to Ultra Wideband signals, wherein both the first communication device and the second communication device are coupled to the control system and are arranged to provide to the control system identification information from all detected wireless devices.

With the systems and methods described herein, wireless devices on or in a vehicle can be identified at regular intervals to determine the presence of both authorized and unauthorized devices. Unauthorized devices can be authorized or they can be searched for and removed from the vehicle if desired. This can facilitate routine, frequent scanning for unauthorized devices to reduce the ability for unauthorized people to place tracking devices on a vehicle or within an occupant's personal items.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figures 1, 2, 3:
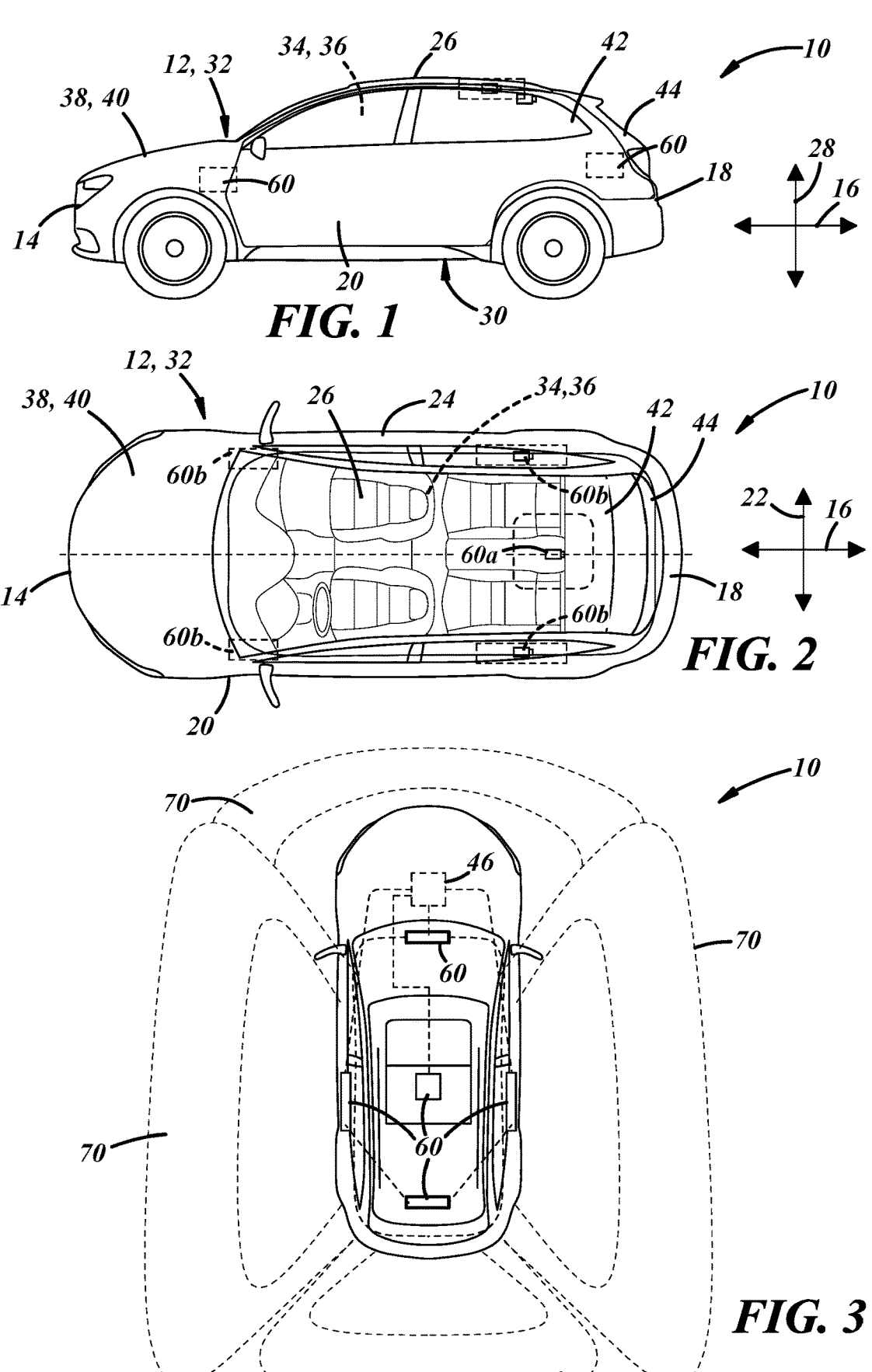
FIG. 1 is a side view of a vehicle.
FIG. 2 is a top view of the vehicle.
FIG. 3 is a top view of a vehicle with diagrammatic indication of wireless receiver range.

Referring in more detail to the drawings, FIGS. 1 and 2 illustrate a vehicle 10 having a body 12 with a front end 14 spaced in a fore-aft direction 16 from a rear end 18, a left side 20 spaced in a cross-car direction 22 from a right side 24, and a top side 26 spaced in a vertical direction 28 from a bottom side 30. The vehicle 10 includes an exterior 32 that is defined by the components and surfaces exposed to the environment outside the vehicle, including surfaces at the bottom side 30 and generally facing the ground. An interior 34 of the vehicle 10 may include one or more compartments or regions that are enclosed and not directly exposed to the outside environment. The compartments may include, by way of non-limiting examples, a passenger compartment 36, a front compartment 38 usually enclosed by a hood 40 and situated forward of the passenger compartment 36, and in the case of utility vehicle as shown, a cargo area 42 behind the passenger compartment 36 and contiguous therewith, and bounded by a rear tailgate or liftgate 44. Other vehicles may include other regions. For example, a pickup truck includes a rear bed that may be open top or covered, and a sedan or coupe may include a rear compartment/trunk generally enclosed by a trunk lid.

Figures 4, 5:
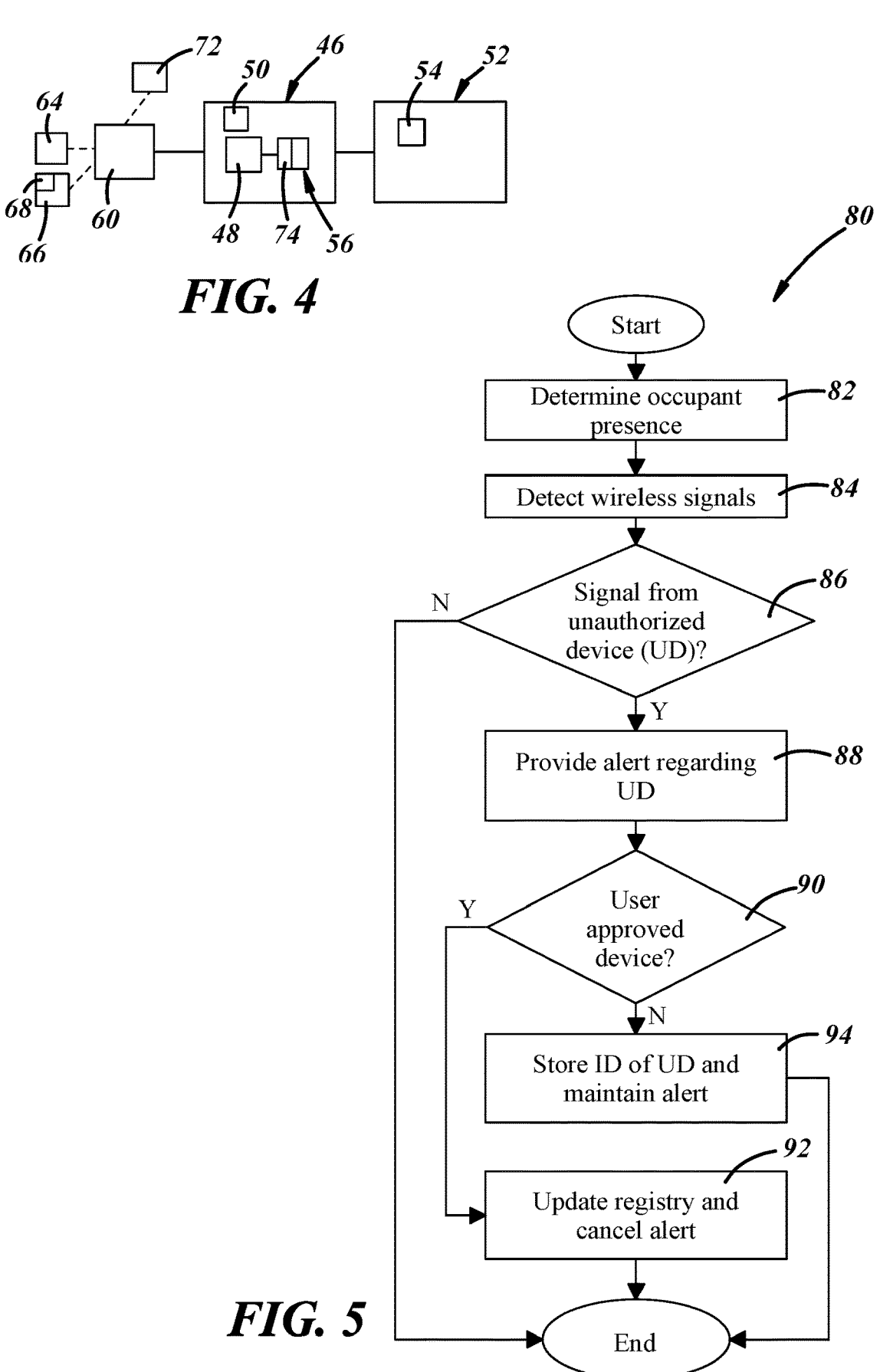
FIG. 4 is a diagrammatic view of a vehicle control system, infotainment system and a receiver.
FIG. 5 is a flowchart of a method for detecting unauthorized devices on or in a vehicle.

As shown in FIGS. 3 and 4, the vehicle includes a control system 46 that may include multiple controllers/processors 48, and various inputs and outputs including sensors 50 to permit control of different vehicle systems including partial or fully automated driving systems, braking, steering, acceleration, engine or electric motor control and the like. The control system 46 also controls an infotainment system 52 including audio and video systems, and a user interface 54, often a display and inputs, which may be provided via a touch screen display, provided with various menu options by which the user can control certain vehicle systems like HVAC, music, information displays, and certain vehicle/preference settings like suspension stiffness, driving mode (e.g. normal, sport, and economy powertrain modes), and the like.

In order to perform the prescribed functions and desired processing, as well as the computations therefore (e.g., determination of wireless signal device ID, comparison of detected device ID to a registry of IDs, control algorithm(s), and the like), the control system 46 or one or more controllers 48 may include, but not be limited to, a processor(s), computer(s), DSP(s), memory 56, storage, register(s), timing, interrupt(s), communication interface(s), and input/output signal interfaces, and the like, as well as combinations comprising at least one of the foregoing. For example, controllers 48 may include input signal processing and filtering to enable accurate sampling and conversion or acquisitions of such signals from sensors and communications interfaces.

As used herein the terms control system 46 or controller or processor 48 may refer to one or more processing circuits such as an application specific integrated circuit (ASIC), an electronic circuit, a processor (shared, dedicated, or group) and memory 56 that stores data/files and permits execution of one or more software or firmware programs or instructions, a combinational logic circuit, and/or other suitable components that provide the described functionality.

The vehicle 10 may also include one or more communication devices 60 (e.g. antennas, receivers, transmitters, transceivers), by which wireless signals are received and transmitted from the vehicle 10. Two arrangements for multiple communication devices 60 are shown in FIGS. 2 and 3, and any number and arrangement of devices may be used, as desired, and calibrated in such a way to reduce blind spots seen with different vehicle passenger compartment/cabin layouts. The devices may receive and/or transmit wireless signals, for example via Bluetooth, wifi, cellular and Ultra Wideband protocols, by way of non-limiting examples. The devices 60 may permit data and voice communication for various systems and functions via wireless transmission of information between wirelessly coupled devices, as is known.

For example, the communication devices 60 may receive signals from a key fob 64 (FIG. 4) by which vehicle doors may be remotely locked or unlocked, and a vehicle engine may be remotely started, for example. Signals transmitted from the key fob 64 are picked up by one or more communication devices 60 of the vehicle and relayed to the control system 46 which causes a desired action to occur.

Similar functionality and additional functionality can be provided to and from a smart phone or other remote device 66 that may be wirelessly coupled to the vehicle control system 46 via one or more communication devices 68 (e.g. a transceiver) of the remote device 66, to permit control of certain vehicle systems via a software application on the remote device 66, and to permit display of information provided from the vehicle control system 46 on the remote device 66. Representative information may include the status of vehicle doors (e.g. locked or unlocked), windows (e.g. open or closed), tire pressure, mileage, oil change recommendations, service alerts (e.g. from vehicle diagnostic systems) and the like. Further, the remote device 66 may be registered with the vehicle 10 and usable like a key or key fob, to permit starting of a vehicle's prime mover (e.g. engine or electric motor(s)), unlocking of doors which may be done based upon proximity of the remote device 66 to the vehicle (e.g. when the phone is within a few feet of the vehicle such as in a Near Field Communication arrangement), and other functions.

In at least some implementations, the communication devices 60, 68 of the vehicle 10 and the remote device 66 may be or include Bluetooth devices, or Ultra Wideband (UWB) devices suitable for short range, high bandwidth communications in the radio spectrum of frequencies, although other devices using other wireless protocols can be used. As shown in FIGS. 2 and 3, the vehicle communication devices 60 are spaced apart from each other and located in different areas of the vehicle to facilitate connection and communication with remote devices 68 that may be in different locations relative to the vehicle 10. In at least some implementations, the communication devices 60 are arranged so that they have an overlapping connection/detection range 70, shown in FIG. 3, to reduce or avoid gaps in the coverage area.

Some devices, like location tracking devices 72 (FIG. 4), use a wireless communication protocol, like UWB or Bluetooth (e.g. BLE or low-energy Bluetooth), to wireless connect to a host device that is within the connection range of the tracking device. Representative signal ranges of such devices are up to about 60 to 80 meters of the device for BLE and within 200 meters for UWB (line of sight), with some example devices for vehicles being limited to a communication range of about 1 to 10 meters, with some examples having a preferred range of between 1 and 3 meters, due to interference from components of the vehicle (e.g. body panels) located between the communication devices and a remote device, and device/antenna size and device power limitations, as well as for an improved user experience.

When connected to a tracking device 72, the host device then communicates with a remote server to provide an indication of the location of the tracking device, as a function of the location of the host device. When the tracking device 72 or host device is moved, such that a distance between them is greater than the connection range, the tracking device may search for and connect with a different host device that is in the connection range of the tracking device such that different host devices may each be temporarily connected with the tracking device.

In this arrangement, the tracking device 72 includes an antenna and a transmitter (e.g. a transceiver) that outputs/broadcasts a signal via the antenna seeking connection with a host device. Similarly, the host device includes an antenna capable of receiving the broadcasted signal and a transmitter capable of broadcasting location information by which the location of the tracking device 72 can be determined by a person or a device remotely located from the tracking device, which can be any distance from the tracking device and need not be within the connection range of the tracking device. Thus, various host devices may interact with the tracking device and provide a distributed network of connection points for the tracking device to enable determination of the location of the tracking device over a wide range of locations. Representative tracking devices are Apple Airtags, Tile and Samsung SmartTag, although other brands and types of devices may be used.

While convenient to permit a person to track the location of a desired objects or things, which may be animate or inanimate, and that may be transported or move over some distance, the tracking devices 72 can be used surreptitiously to track a thing by a tracker who does not have permission of the owner of the thing to do so. For example, a tracking device 72 may be attached to the vehicle 10 so that a person can determine the location of the vehicle 10 as a way to track the vehicle itself or a person associated with the vehicle 10. Vehicle thieves have been known to attach a tracking device to a vehicle that they plan to later steal, and people (e.g. stalkers) have been known to attach a tracker to a vehicle of other object (e.g. a personal item, like a purse or bag of a vehicle occupant) for the purpose of tracking a person without that person's knowledge.

To permit detection of a wireless device such as a tracking device 72 on or within the vehicle 10, one or more communication devices 60 of the vehicle may be arranged to detect signals broadcast from a tracking device 72. Each communication device 60 may include one or more antenna and may be associated with devices (e.g. the control system 46) suitable to determine the various wireless signals broadcast by a variety of different wireless devices, including different brands and types of tracking devices 72, with UWB and BLE being two examples of wireless device types. The communication devices 60 and associated devices 46 may be used for other functions of the vehicle 10, such as are noted herein, or they may be provided solely for the purpose of detecting a broadcast signal, and alerting a user to the presence of a device broadcasting the signal. In the example of a BLE device (labeled 60a in FIG. 2 only), an antenna thereof may be provided in the interior 34 of the vehicle 10, such as behind an interior trim piece or interior component like a headliner, central console, rearview mirror, pillar cover, seat back or the like. One or more communication devices 60 (such as UWB devices labeled 60b in FIG. 2 only) could also be located at or near the exterior of the vehicle, and arranged with a short connection range 70 to provide controlled interaction with remote devices 66 of interest (e.g. authorized and registered for use with the vehicle).

The communication device(s) 60 is/are connected to the vehicle control system 46 and provide to the control system 46 data from a detected or received wireless signal. The data includes identification information about the device 72 sending the detected or received wireless signal, where the identification information may include a code unique to the device 72 so that each wireless device has a unique identification code which helps to distinguish among devices. In the memory of or communicated with the control system 46, a registry 74 of authorized devices is stored. The registry 74 includes identification information for devices that are part of the vehicle as manufactured, including any device that transmits a wireless signal. Further, the registry 74 may be updated by an authorized entity, such as the vehicle manufacturer, a service technician with rights to do so, or the owner of the vehicle, for example, to include in the registry 74 devices installed in the vehicle by the user, or brought into the vehicle by the user. For example, a portable/remote device 66 like a smart phone, tablet or computer may be added to the registry 74 by a user so that the control system recognizes the remote device 66 as an authorized device.

The registry 74 may be updated in any desired way, such as through the vehicle infotainment system 52 or via application software on the portable device 66 or a computer, through which the control system 46 may provide an interface including menu prompts navigable by a user to update the registry. In this way, the registry 74 may be updated over the air, via a wireless transmission to the vehicle 10 that is received by a communication device/receiver 60 of the vehicle and communicated with the control system 46.

In at least some implementations, with multiple communication devices 60 in or on the vehicle, the broadcast signal from a wireless device like a tracking device 72 may be received by more than one communication device 60. A strength of the received signals can be compared by the control system to determine a predicted location of the detected wireless devices, using, for example, triangulation or other object locating techniques or algorithms. The predicted location might be a relatively large area of the vehicle, but can still help a user to locate wireless devices in or on the vehicle.

FIG. 5 illustrates a method 80 for detecting wireless devices on or in a vehicle. The method begins at step 82 in which an initiating criterion is determined. In this example, the initiating criterion is when the control system 46 determines that a person is initially present in a vehicle 10, which may be determined by opening of a door, a seat occupancy sensor, seatbelt sensor, or in any desired way. The initiating criterion could instead by the starting of a vehicle engine or motor, shifting the vehicle out of a park gear, expiration of a timer or any desired criterion. Further, one or multiple criteria may be used to initiate the method, as desired. When the initiating criterion or criteria are satisfied, the method 80 continues to step 84.

In step 84, the system seeks to detect wireless signals, and to determine identification information for each device from which a wireless signal is detected. This may be done by using the one or more communication devices 60 in the vehicle 10. The identification information for each device from which a wireless signal is detected is then compared, in step 86, to the registry 74 of authorized devices. If a device is transmitting a signal detected by a receiver of the vehicle, and the device is not an authorized device already included in the registry, then the method 80 proceeds to step 88.

In step 88, an alert is provided in the vehicle that is detectable by an occupant of the vehicle. The alert could be audible and may be played through a speaker in the vehicle, or visual and provided on a display screen in the vehicle, such a display of the infotainment system, and/or on a display of system gauges, like a speedometer, fuel level indicator, and the like. the alert indicates that a device is broadcasting a wireless signal and that the device is not an authorized device.

After providing the alert(s), the method 80 may proceed to step 90 in which the system prompts a user to determine if the user recognizes/approves of the unauthorized device, and if so, in step 92, the registry is updated to include the identification information for the device and the method may end. As noted above, this may be done by a suitable software interface either within the vehicle 10 or communicated to the vehicle from a remote device 66. If not, in step 94 the method may store the identification information of the unauthorized device in memory, maintain the alert and end. The stored identification information for an unauthorized device may be referred to in subsequent iterations of the method, and an alert may identify whether a detected unauthorized device has been previously detected, and if so, subsequent alerts may include additional information such as the day/time of first detection, number of detections, or the like.

The method 80 need not include all noted steps, and may include further steps as desired. For example, after the initial detection of an unauthorized device and before an alert is issued, the method 80 may include rescanning for wireless signals after some threshold event to ensure that the detected wireless device is actually in or on the vehicle. The threshold event may be some period or periods of time, or may be after the vehicle has traveled a certain distance. In this way, false identification of wireless devices that are close to but not on or in the vehicle can be reduced. For example, a device on a pedestrian near but not in the vehicle could be detected, but after the vehicle has moved a threshold distance, the pedestrian is unlikely to still be near enough to the vehicle for the pedestrian's device to be detected by the system. If, after the rescan, the unauthorized wireless device is still detected, then the alert may be issued, or a new alert may be issued.

Of course, other strategies may be employed to confirm the presence of a device on or in the vehicle, or to reduce the instances of false positive results, if desired. In at least some implementations, the detection of an unauthorized devices causes the method to rescan for devices, and for a threshold number of confirmatory results to be achieved before an alert is issued. Each time the same unauthorized device is detected, a counter may be incremented and when the counter tally reaches a threshold, an alert may be issued.

The systems and methods may be effective in detecting a wide range of wireless devices on or in a vehicle and transmitting wireless signals. The system may ignore previously authorized devices, which may be within a registry having identification of such devices, and may provide alerts when devices not included in the registry are detected. This informs a user/occupant of the vehicle about any new wireless devices that are detected in or on the vehicle, and may permit the user/occupant to search for and locate any unwanted wireless devices. Further, the control system 46 may be Firmware Over The Air (FOTA) capable to enable updates to the system, including improvements of the signal detection strategies and algorithms, and to handle new tracking devices 72 that enter the market, or interface updates to the infotainment system 52 to support easier device registration or modify the way the system warns the occupant of a detected device or improve the detection of the location of a detected device in the vehicle.

Further, some vehicle sensors/communication devices 60 are based on line-of-sight, so signals can be blocked by metal structures or other intervening objects. As such, tracking devices hidden within the frame of the car (i.e., between the trim and frame of car) can potentially go undetected. The fuel door opening is another location in which a tracking device can potentially go undetected (as the fuel door can block signals from the device from being detected by the devices 60.

To overcome these limitations, the system may start tracking a device 72 when it enters a "Welcome Zone" which is the outer band/portion of the connection range 70, farthest from the vehicle 10, as shown in FIG. 3. The device 72 could be tracked as it moves from the outer portion of the connection range 70 to the inner portions of the connection range 70 closest to the vehicle, until the device eventually exits the connection range 70. In an example where someone walks up to the vehicle 10 and places a tracking device 72 in a metal blindspot area of the vehicle and then walks away, the system would detect that the tracking device 72 entered the connection range and was detected, made its way to an inner zone of the connection range (e.g. evidenced by a stronger signal being detected), and that the device 72 never left the connection range 70. In this scenario, the system would assume that the device 72 was on or in the vehicle and therefore send a signal or indication that a device 72 was detected but is now unaccounted for. Further, the system could determine the last known zone or area within the connection range 70 in which the device 72 was detected and notify the user of the location at which the device was last detected to facilitate a search for the device. In this example, the system might be continually checking for broadcast signals and consume additional power, which can be provided by the vehicle or a stand-alone battery, for example. Sleep and wake cycles can be defined to reduce energy consumption, as desired.

What is claimed is:

1. A method of detecting a wireless device in or on a vehicle, comprising:
   detecting a wireless signal that includes identification information;
   comparing the identification information with a registry of authorized devices to determine if the identification information corresponds to one of the authorized devices; and
   providing an output when the identification information does not correspond to one of the authorized devices to indicate that an unauthorized device is present in or on the vehicle, wherein the output includes a predicted location on the vehicle of the unauthorized device, and the predicted location is determined based upon a comparison of wireless signals received at different communication devices of the vehicle.

2. The method of claim 1 wherein the identification information includes a code that is unique to each device that transmits the wireless signal.

3. The method of claim 1 which includes the step of providing a prompt to add the identification information to the registry so that a device transmitting the wireless signal is added to the registry as an authorized device.

4. The method of claim 1 wherein the detecting step is accomplished with a communication device that is responsive to one or more of Bluetooth, Ultra Wideband and wifi signals.

5. The method of claim 3 wherein the prompt is provided via a vehicle infotainment system including a display and inputs by which menu options provided on the display can be selected.

6. The method of claim 1 wherein the detecting step is accomplished with a communication device that is part of a vehicle operating system and permits control of at least one vehicle system via a remote device that communicates wirelessly with the communication device.

7. The method of 6 wherein the communication device is arranged to pair with a smart phone to permit operation of the vehicle when the smart phone is paired.

8. The method of claim 1 which also includes determining the presence of an occupant of the vehicle and then detecting all wireless signals present at one or more communication devices of the vehicle, and comparing the identity of all devices providing a wireless signal with the registry.

9. The method of claim 1 which also includes storing identification information of unauthorized devices and wherein the method is run more than one time and includes sending an alert if one of the unauthorized devices is detected in more than one iteration of the comparing step.

10. A vehicle having a system for detecting wireless devices on or within the vehicle, comprising:

a communication device including an antenna capable of receiving a wireless signal;

a display arranged within an interior of the vehicle; and a control system coupled to the communication device and to the display, the control system having a processor and memory including a registry of authorized devices, wherein the control system is operable to determine a presence of an authorized device from identification information from a wireless signal provided by the authorized device, receive another wireless signal and compare the another wireless signal to the registry and to provide an output to the display when the another wireless signal is determined to be from a device that is not one of the authorized devices.

11. The vehicle of claim 10 wherein the communication device is located within the interior of the vehicle.

12. The vehicle of claim 10 wherein the communication device is arranged to permit pairing of a remote device with the control system to permit control of at least one vehicle function via the remote device.

13. The vehicle of claim 12 wherein the at least one vehicle function includes one or more of locking or unlocking a vehicle door, and starting an engine or motor of the vehicle.

14. The vehicle of claim 10 wherein the memory includes instructions that provide an interface via the display that permits a user to add a device to the registry of authorized devices.

15. The vehicle of claim 10 wherein the communication device and the display are part of a vehicle infotainment system that is coupled to the control system and which permits control of one or more of an audio device, a video device, a vehicle heating and cooling system, and vehicle preference settings.

16. The vehicle of claim 10 wherein the communication device is a first communication device that is responsive to Bluetooth signals, and wherein the vehicle also comprises a second communication device that is responsive to Ultra Wideband signals, wherein both the first communication device and the second communication device are coupled to the control system and are arranged to provide to the control system identification information from all detected wireless devices.

17. The method of claim 1 wherein, before the step of providing an output, the step of detecting the wireless signal is repeated periodically and each time a detected wireless signal is determined to be from an unauthorized device a counter is incremented, and wherein the output is provided after the counter reaches a threshold.

18. The method of claim 1 wherein the step of detecting a wireless signal is performed at a first location of the vehicle and before the step of providing an output, the step of detecting the wireless signal is repeated after the vehicle has moved from the first location to a second location, and the step of providing the output is performed when a detected wireless signal is determined to come from an unauthorized device and the identification information of the unauthorized device is the same in the first location and the second location.

19. A method of detecting a wireless device in or on a vehicle, comprising:

detecting, when the vehicle is at a first location, a first wireless signal that includes identification information;

comparing the identification information with a registry of authorized devices to determine if the identification information corresponds to an authorized device;

detecting, when the vehicle is at a second location that is different than the first location, another wireless signal that includes identification information;

determining that the another wireless signal and the first wireless signal were provided from the same device and that the same device is not in the registry of authorized devices; and providing an output to indicate that an unauthorized device is present in or on the vehicle.

20. The method of claim 19 wherein the output includes a predicted location on the vehicle of the unauthorized device, and the predicted location is determined based upon a comparison of wireless signals received at different antennas of the vehicle.

* * * * *